(12) United States Patent
Santavicca et al.

(10) Patent No.: US 10,315,624 B2
(45) Date of Patent: Jun. 11, 2019

(54) BUTTON ASSEMBLY DEVICE FOR CONTROLLING ACCESS TO A VEHICLE

(71) Applicant: VOXX INTERNATIONAL CORPORATION, Hauppauge, NY (US)

(72) Inventors: Joseph Anthony Santavicca, Macomb, MI (US); Tristen Kyle Pierson, Rochester, MI (US); Benson James Brady, Detroit, MI (US); Kevin Tang, Troy, MI (US)

(73) Assignee: VOXX INTERNATIONAL CORP, Hauppauge, NY (US)

( * ) Notice: Subject to any disclaimer, the term of this patent is extended or adjusted under 35 U.S.C. 154(b) by 0 days.

(21) Appl. No.: 15/855,198

(22) Filed: Dec. 27, 2017

(65) Prior Publication Data

US 2018/0178759 A1 Jun. 28, 2018

Related U.S. Application Data

(60) Provisional application No. 62/439,622, filed on Dec. 28, 2016.

(51) Int. Cl.
*B60R 25/25* (2013.01)
(52) U.S. Cl.
CPC .................................. *B60R 25/25* (2013.01)
(58) Field of Classification Search
CPC ...................................................... B60R 25/25
USPC ................................................. 340/5.5–5.55
See application file for complete search history.

(56) References Cited

U.S. PATENT DOCUMENTS

| 5,661,651 A * | 8/1997 | Geschke ............. B60C 23/0408 |
| | | 701/88 |
| 6,583,715 B1 | 6/2003 | Benzie et al. |
| 2004/0201277 A1 | 10/2004 | Hentsch et al. |
| 2006/0103529 A1 | 5/2006 | Ohmura et al. |
| 2006/0114100 A1 * | 6/2006 | Ghabra .................... E05B 81/78 |
| | | 340/5.61 |
| 2006/0255906 A1 * | 11/2006 | Ghabra .................... B60R 25/24 |
| | | 340/5.25 |
| 2007/0115096 A1 | 5/2007 | Suzuki et al. |
| 2009/0085720 A1 | 4/2009 | Kurpinski et al. |
| 2011/0086668 A1 | 4/2011 | Patel |
| 2013/0099892 A1 | 4/2013 | Tucker et al. |

(Continued)

FOREIGN PATENT DOCUMENTS

WO  WO2015137186  4/2017

OTHER PUBLICATIONS

International Search Report dated Mar. 13, 2018 in corresponding PCT International Application No. PCT/US17/68667.

*Primary Examiner* — Allen T Cao
(74) *Attorney, Agent, or Firm* — F. Chau & Associates, LLC

(57) ABSTRACT

A device for controlling access to a vehicle, the device including: a housing, the housing including a transmitter, a receiver, a microcontroller and an unlocking mechanism, wherein the housing is configured to be mounted to a vehicle and, in response to a triggering event at the unlocking mechanism, the microcontroller is configured to advertise itself to allow a previously linked remote device to connect and, once a connection is established with the remote device, the transmitter is configured to send an unlock signal to an electronic control unit inside the vehicle to unlock a door of the vehicle.

14 Claims, 3 Drawing Sheets

(56) References Cited

U.S. PATENT DOCUMENTS

| | | |
|---|---|---|
| 2013/0259232 A1 | 10/2013 | Petel |
| 2015/0109116 A1* | 4/2015 | Grimm ............... B60R 25/1001 340/426.18 |
| 2015/0228132 A1 | 8/2015 | Geerlings et al. |
| 2015/0358315 A1 | 12/2015 | Cronin |
| 2015/0363988 A1* | 12/2015 | Van Wiemeersch ..... H04M 1/11 455/557 |
| 2016/0099927 A1* | 4/2016 | Oz .......................... H04L 63/08 726/9 |
| 2017/0241188 A1* | 8/2017 | Kalhous .................. E05F 15/40 |
| 2017/0313262 A1* | 11/2017 | Wisnia ................... B60R 11/04 |
| 2017/0370132 A1* | 12/2017 | Da Deppo ............. B60R 25/01 |

* cited by examiner

BUTTON ASSEMBLY DEVICE FOR CONTROLLING ACCESS TO A VEHICLE

CROSS-REFERENCE TO RELATED APPLICATION

This application claims priority under 35 U.S.C. § 119/120 to U.S. provisional application No. 62/439,622, filed on Dec. 28, 2016 in the U.S. Patent and Trademark Office, the disclosure of which is incorporated by reference herein in its entirety.

TECHNICAL FIELD

The present invention relates to an electronic vehicle access system.

SUMMARY

According to an exemplary embodiment of the present invention, there is provided a device for controlling access to a vehicle, the device including: a housing, the housing including a transmitter, a receiver, a microcontroller and an unlocking mechanism, wherein the housing is configured to be mounted to a vehicle and, in response to a triggering event at the unlocking mechanism, the microcontroller is configured to advertise itself to allow a previously linked remote device to connect and, once a connection is established with the remote device, the transmitter is configured to send an unlock signal to an electronic control unit inside the vehicle to unlock a door of the vehicle.

According to an exemplary embodiment of the present invention, the triggering event is permitted only when the remote device is within a predetermined range from the vehicle.

According to an exemplary embodiment of the present invention, the device will timeout when the remote device exits the predetermined range.

According to an exemplary embodiment of the present invention, the unlocking mechanism is a button or biometric sensor.

According to an exemplary embodiment of the present invention, the triggering event occurs when a person touches the button, or is authenticated by the biometric sensor.

According to an exemplary embodiment of the present invention, the door is locked by double-pressing the button.

According to an exemplary embodiment of the present invention, the remote device is a smartphone.

According to an exemplary embodiment of the present invention, the housing is mounted near the driver side door handle of the vehicle.

According to an exemplary embodiment of the present invention, the remote device and the receiver communicate via a short-range wireless transmission technique.

According to an exemplary embodiment of the present invention, the short-range wireless transmission technique is Bluetooth Low Energy.

According to an exemplary embodiment of the present invention, the unlock signal is sent to the vehicle in an ultra high frequency transmission.

According to an exemplary embodiment of the present invention, there is provided a device for controlling access to a vehicle, the device including: a housing, the housing including a transmitter, a receiver, a microcontroller and an unlocking mechanism, wherein the housing is configured to be mounted to a vehicle and, in response to a triggering event at the unlocking mechanism, the microcontroller is configured to allow a previously linked remote device to connect and, once a connection is established with the remote device, the transmitter is configured to send an unlock signal to an electronic control unit inside the vehicle to unlock a door of the vehicle.

According to an exemplary embodiment of the present invention, the unlocking mechanism is a chip reader.

According to an exemplary embodiment of the present invention, the triggering event occurs when the remote device is in frequency range of the chip reader.

DETAILED DESCRIPTION OF EXEMPLARY EMBODIMENTS

Figure 1:
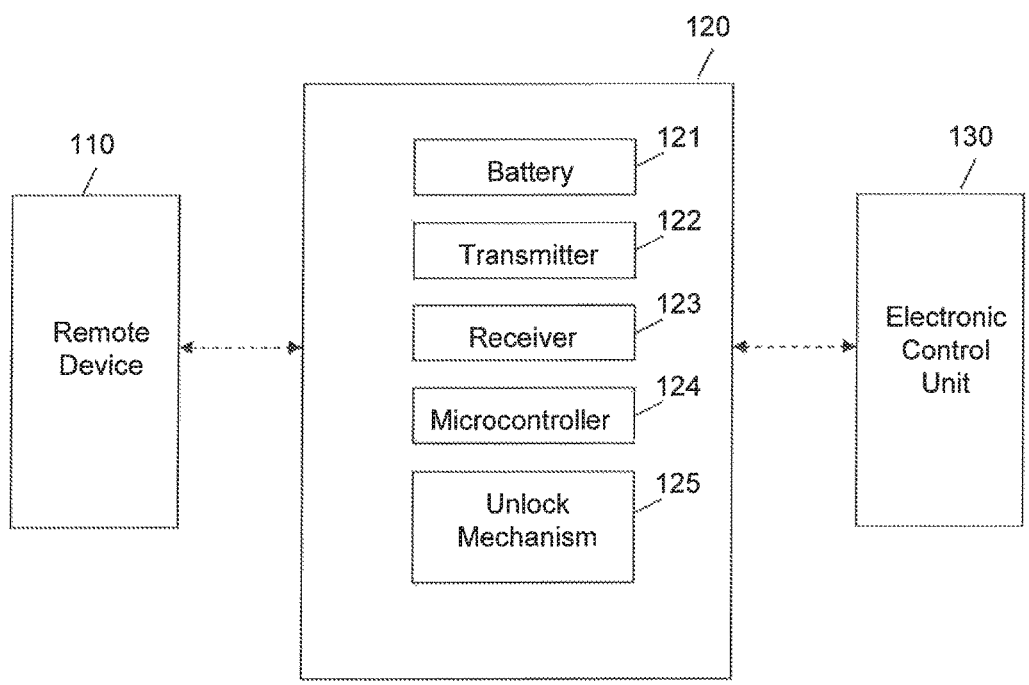
FIG. 1 illustrates a device for controlling access to a vehicle according to an exemplary embodiment of the present inventive concept.

FIG. 1 illustrates a device for controlling access to a vehicle according to an exemplary embodiment of the present inventive concept.

As shown in FIG. 1, there is provided a remote device 110, the device 120 for controlling access to a vehicle and an electronic control unit 130 of the vehicle. The remote device 110 may be a smartphone. The remote device 110 may also be a smart card that can wirelessly exchange data with another device. For example, the remote device 110 may be a near field communication (NFC) card. The electronic control unit 130 may be an embedded system that controls one or more of the electrical system or subsystems in a vehicle. For example, the electronic control unit 130 may control the locking or unlocking of the vehicle's doors as well as the starting and heating functions of the vehicle.

The device 120 for controlling access to a vehicle according to an exemplary embodiment of the present invention may include a battery 121, transmitter 122, receiver 123, microcontroller 124 and unlock mechanism 125.

The device 120 may be a standalone button assembly used to control access to the vehicle via Bluetooth Low Energy (BLE), for example. The device 120 may be mounted to a vehicle, for example, near the driver side door handle. The vehicle may be unlocked by pressing the button on the device 120 when a previously linked smartphone is nearby. Unlock signals may be sent to the vehicle through ultra high frequency (UHF). The device 120 may interact with factory or aftermarket remote keyless entry (RKE) systems. The vehicle may be unlocked by double-pressing the button on the device 120. In this case, no smartphone linkage is required. With the addition of a Cloud component, tokens may be shared remotely to allow vehicle access by peers.

The device 120 may be powered by the battery 121 such as Lithium coin cells, or through vehicle power. Alternatively, a rechargeable battery may be used which may be recharged through solar cells or mechanical energy harvesters. The button may constitute the unlock mechanism 125 and may be mechanical, capacitive touch or a biometric sensor. The button may be supplemented or replaced with an NFC chip reader allowing NFC based authentication. Other radio frequency identification (RFID) technologies may also be used to supplement the button. NFC based authentication may be used to facilitate secure pairing and vehicle access.

With a secure software application, secondary authentication may be implemented including but not limited to: fingerprint biometrics, gestures, PIN code, iris biometrics, facial recognition, two dimensional capacitive touch swipe pattern, etc. On-body code transmission may be used as a replacement to Bluetooth or as secondary authentication. On-body transmission in this application would work as follows: 1) a user touches a transmitter such as a smartphone fingerprint reader or smartwatch heart rate monitor while also touching a receiver electrode located on the device 120; 2) the receiver listens for electromagnetic pulses; and 3) a modulated code is sent from the smartphone's fingerprint reader and propagates through the body's conductive tissue under the epidermis until it is received on the device 120. If the code authentication is valid, the unlock signal is sent to the vehicle.

The device 120 may include a circuit board with a Bluetooth chip for communication with the smartphone 110 and a sub-gigahertz chip for sending signals to the vehicle. The Bluetooth chip may include the receiver 123 and the sub-gigahertz chip may include the transmitter 122, for example.

As described above, in order for the vehicle to be unlocked by pressing the button on the device 120, the device 120 must be pre-linked to the remote device 110. For this discussion, the remote device 110 will be referred to as a smartphone. To accomplish this, there may be provided a primary user interface that runs on the smartphone. The interface contains, at a minimum, a device configuration manager. The device configuration manager may be accessed by holding the button for at least five seconds. At this time, an Eddystone-URL to the remote Web-Bluetooth based device configuration manager application is advertised. The user can now load the device configuration manager once their phone sees the URL.

The device configuration manager requires user authentication to access. Once access is granted, the interface may be used to initiate pairing. Pairing is not required to access the device configuration manager. Smartphone linkage is created upon pairing. Apart from pairing, the device configuration manager also allows for removal of paired devices. It is to be further understood that no app may be needed. In this case, the user may rely on the phone's operating system or Bluetooth security for access.

Security is handled in several areas. For example, the primary Bluetooth connection may use LE security mode 1 level 3 pairing using passkey entry. The device configuration Bluetooth connection may use LE security mode 1 level 1 with no pairing. In this case, the device configuration manager is only usable after positive user authentication with a secure salted password hash via SHA256. Sharing security may be handled by the use of tokens which are generated by hashing cryptographically secure pseudo random numbers. For example, public tokens may be generated using a CSPRNG: PublicToken=csprng(32). Private tokens may be generated as the SHA256 hashed sum of the public token and a 32-byte random number generated using a CSPRNG hashed via SHA256: PrivateHash=sha256(csprng (32)); PrivateToken=sha256(PrivateHash+PublicToken).

Figure 2:
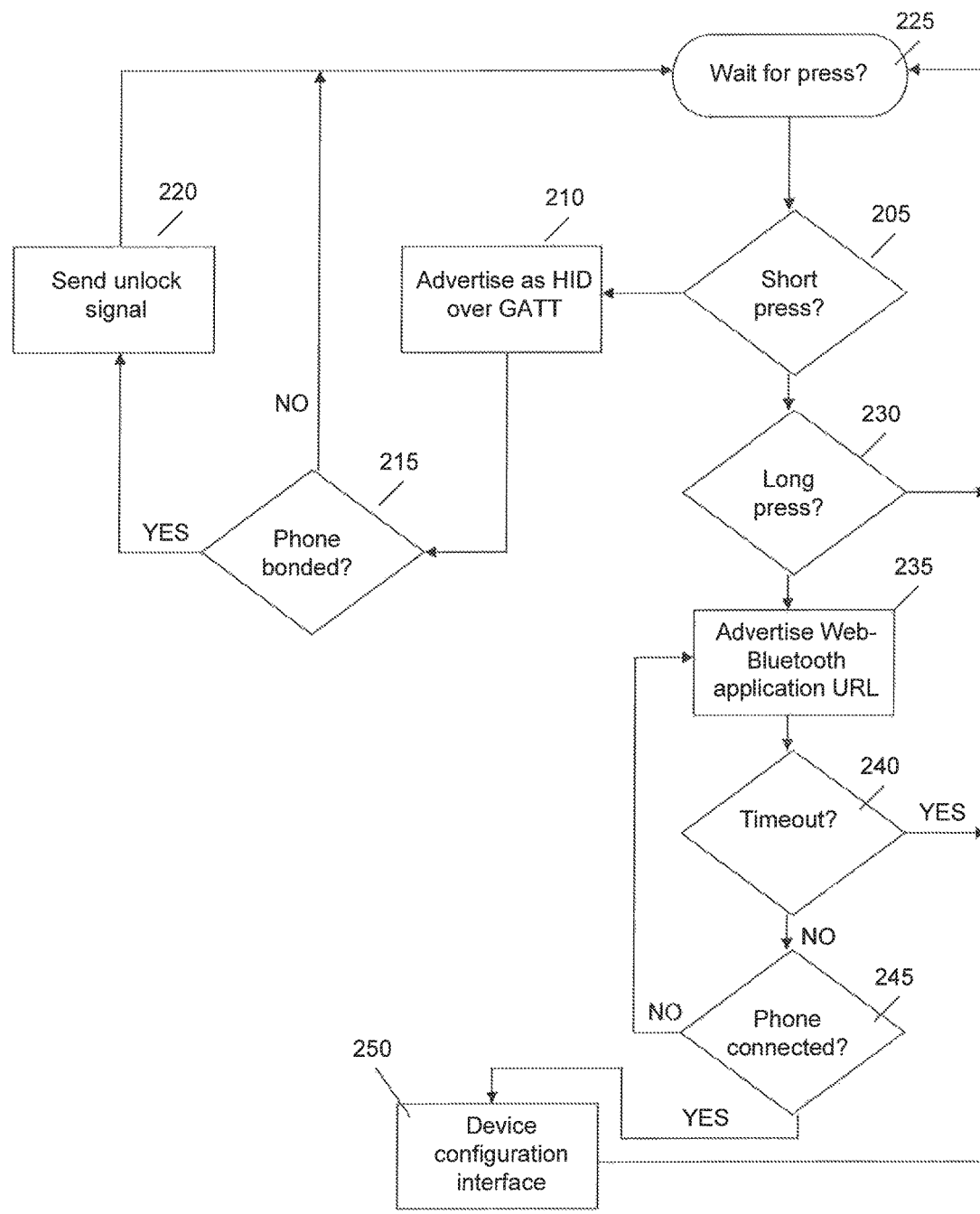
FIG. 2 illustrates a method for operating the device for controlling access to a vehicle.

FIG. 2 illustrates a method for operating the device for controlling access to a vehicle. For example, FIG. 2 illustrates an appless consumer mode case.

As shown in FIG. 2, on a short press (205), the device 120 immediately advertises (210) allowing a paired smartphone to connect. The short press may be, for example, a half second or less. Once a paired connection is established (215), an unlock signal is sent to the vehicle (from device 120 or phone 110) (220). In the absence of a paired smartphone, the device 120 will timeout (240) and go to sleep (225). Here, Bluetooth LE security mode 1 level 3—pairing using passkey entry, is used.

On a long press (230), the device 120 will advertise a URL to a Web-Bluetooth based javascript web application which contains the device configuration manager. The long press may be, for example, one and a half seconds or greater. Here, Bluetooth LE security mode 1 level 1—no pairing, is used. For example, the device 120 advertises packets with URL (235), user goes to website, website loads app to phone (245), and obtains message to communicate with vehicle to add/delete user (250).

Figure 3:
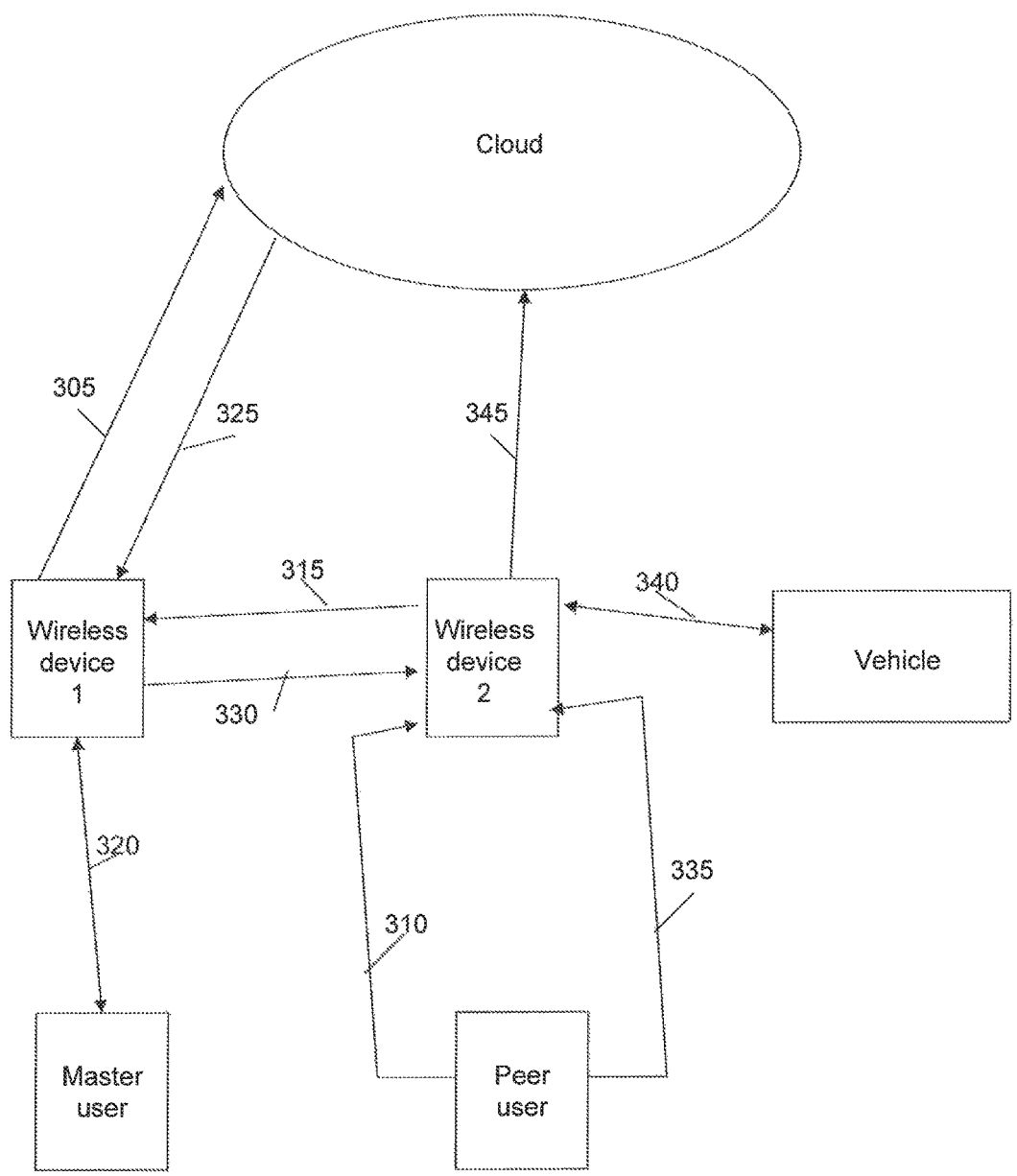
FIG. 3 illustrates another method for operating the device for controlling access to a vehicle.

FIG. 3 illustrates another method for operating the device for controlling access to a vehicle. For example, FIG. 3 illustrates an appless sharing case.

In FIG. 3, secure remote credential sharing is made possible through the use of private and public tokens and a Cloud. Private tokens are stored in the device 120 and are not accessible; public tokens are stored on the Cloud. The Cloud contains part numbers, serial numbers, and public tokens for every device 120. A share request is made by a peer user through the device web application's share request portal which bundles and sends a URL with the device part number and serial number information to the anticipated master user. When the master user clicks the URL, a javascript app is loaded which prompts for share information. Once confirmed, the application sends back a URL bundled with the public token used to grant the peer user smartphone pairing access. After the peer user has access granted, the device will generate a new public token and upload it to the Cloud. Once a peer user is paired, they have the vehicle unlock access until the master user locally revokes access through the device configuration manager.

For example, as shown in FIG. 3, wireless device 1 performs a one-time device setup and uploads an initial public token to the Cloud (305). The Cloud may store the public token with the device's part number and serial number. Next, a peer user may connect to wireless device 1 and gain access to the web app (310). For example, the peer user uses wireless device 2 to request access to the web app (315). The master user may receive and approve the peer's request (320). It is to be understood that the request includes a link to the app. In (325), the app grabs the public token from the Cloud and, in (330), the master send the app's URL with the public token embedded. The peer then gains access to the device 120 via the public token and initiates pairing (335). When pairing completes, vehicle access is granted and the device 120 creates a new public token. In (345), the web app uploads the new public token to the Cloud.

In an exemplary embodiment of the present invention, the device for controlling access to a vehicle may be used for fleet/lot management. In this case, for example, the device 120 may be attached to every vehicle in a lot or in a fleet. Through a remote web application, a pre-determined list of users can have vehicle access authorized. Authorized salesmen or pre-registered customers are able to access any vehicle. For example, a ride sharing customer can access a fleet vehicle with the keys locked inside. Vehicle access reports can be generated and automatically sent to a Cloud server from the user's smartphone which allows fleet/lot management services to track who/when/where their vehicles were accessed. The device 120 can have a vehicle stock number programmed at time of install which would allow for a salesperson or customer to see sales information through a webpage advertised by an Eddystone-URL. This information may be available publicly or privately depending on authorization. With the latter case, a web login authorization would be required. The device 120 may also advertise information about the vehicle, incentives, specials, etc. through a webpage advertised by an Eddystone-URL.

In an exemplary embodiment of the present invention, the device for controlling access to a vehicle may be used for pushbutton start mobilization. In this case, for example, the device 120 can be used to mobilize a vehicle for pushbutton starting. A sensor module with access to the vehicle network can be located in the vehicle. As soon as vehicle entry has been authorized, the interior sensor will start searching for the phone to determine basic location (e.g., inside or outside vehicle). The interior sensor can allow engine start if the phone is located inside the vehicle.

According to an exemplary embodiment of the present invention, the device 120 is a battery operated push button used to control vehicle access such as unlock and lock. The device 120 is designed to mount on the vehicle door or other external body panel. Simply unlock the vehicle by pressing the button on the device 120 when a previously linked smartphone is in close proximity (about 5 feet or less). Up to eight smart phones can be linked to the device 120 using a six digit PIN, for example. All phones can be removed using a simple procedure.

Temporary users may be added, deleted, or caused to automatically expire through the use of a secure credential sharing web-app that is linked to the device 120 and master smart phone using the secure web key sharing service. The user would be required to set up an account and generate a master password to enable this feature.

The device 120 enables a user to leave keys in their vehicle while outdoors, playing sports, shopping or doing just about any other activity. The device 120 enables access to your vehicle when you do not have your keys. The device 120 prevents you from locking yourself out, or children/pets in. The device 120 provides temporary access of your vehicle to others without providing an ignition key or transmitter. The device 120 also provides complementary enhancement to a vehicle's access system (keyless entry or telematics access system) and can provide any function that the vehicle key fob provides.

According to an exemplary embodiment of the present invention, the device 120 seamlessly links to a smart phone via a secure Bluetooth connection without the need for an app. For example, since no phone app needed, you do not need to fumble with the phone to open an app. In addition, with the device 120 you can unlock your vehicle when your already paired smart phone is within about 6~8 feet of the vehicle as long as the phone is powered on and Bluetooth is enabled.

In an exemplary embodiment of the present invention, the Bluetooth of the device 120 may be turned off. Therefore, a smartphone can be left inside a vehicle, and not accidently cause the vehicle's doors to be unlocked. When a user returns to the vehicle (with the smartphone locked inside) they can enter a secret code via the unlock mechanism 125 to turn on the Bluetooth of the device 120 so that the user can gain access to the vehicle. For example, once the device's Bluetooth is turned-on, the proximity of the phone to the device 120 will allow the user to press the button on the device 120 to open the door. A secret code can also be used to turn off the Bluetooth of the device 120.

In an exemplary embodiment of the present invention, there may also be provided a Bluetooth (or other short-range wireless technology) equipped key. The key may be left in the vehicle's ignition. This key may also include an LED indicator and a battery, circuitry for authentication, and an immobilizer. Only when authenticated, can be the key be used to start the vehicle; otherwise, attempts to start the vehicle will fail. The key may communicate with the device 120 or a keypad on a vehicle door.

The key can be cut and programmed to the vehicle by a dealer using the same process for replacement key fob programming. The key can be permanently left in the vehicle's ignition. Bluetooth and immobilizer electronics are built into the key head. The key only becomes active when an authenticated connection with a Bluetooth enabled smartphone is made. A person can turn the key to start the vehicle just as they would using the original factory key. For example, one turn, and the authentication request goes out. If authentication is validated, and the validated phone is within proximity to the key, the key can be turned again and the car started. The car cannot be started unless an authenticated smartphone is within Bluetooth range of the key.

In order to protect against a lost, stolen or dead battery cell phone there are two system options which will allow the user to enter and start their vehicle.

In one option, the vehicle can be equipped with an NFC reader that is paired to the Bluetooth key and the user is provided with an NFC wallet card to carry as a back up. The NFC reader can either be a plug in on-board diagnostics (ODB) dongle or a small puck style reader mounted to the underside of a windshield, for example. Tapping the NFC wallet card against the reader will unlock doors and/or enable the Bluetooth key immobilizer.

In another option, if the system is equipped with a wireless Bluetooth keypad as the vehicle access method, then entering a five-digit numeric code into the keypad can also enable the Bluetooth key immobilizer.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A device for controlling access to a vehicle, the device comprising:
   a housing, the housing including a transmitter, a receiver, a microcontroller and an unlocking mechanism, wherein
   the housing is configured to be mounted to a vehicle and,
   in response to a triggering event at the unlocking mechanism, the microcontroller is configured to advertise itself to allow a previously authenticated remote device to connect and, once a connection is established with the remote device,
   the transmitter is configured to send an unlock signal to an electronic control unit inside the vehicle to unlock a door of the vehicle,
   wherein the triggering event is initiated when the remote device enters a predetermined range from the vehicle, and when the triggering event is initiated it is determined if the remote device has been previously authenticated, and
   when it is determined that the remote device was previously authenticated, a user of the remote device enters a code at the housing to cause the transmitter to send the unlock signal to the electronic control unit.

2. The device of claim 1, wherein the triggering event is permitted only when the remote device is within the predetermined range from the vehicle.

3. The device of claim 2, wherein the device will timeout when the remote device exits the predetermined range.

4. The device of claim 1, wherein the unlocking mechanism is a button or biometric sensor.

5. The device of claim 4, wherein the triggering event occurs when a person touches the button, or is authenticated by the biometric sensor.

6. The device of claim 5, wherein the door is locked by double-pressing the button.

7. The device of claim 1, wherein the remote device is a smartphone.

8. The device of claim 1, wherein the housing is mounted near the driver side door handle of the vehicle.

9. The device of claim 1, wherein the remote device and the receiver communicate via a short-range wireless transmission technique.

10. The device of claim 9, wherein the short-range wireless transmission technique is Bluetooth Low Energy.

11. The device of claim 1, wherein the unlock signal is sent to the vehicle in an ultra high frequency transmission.

12. A device for controlling access to a vehicle, the device comprising:

a housing, the housing including a transmitter, a receiver, a microcontroller and an unlocking mechanism, wherein the housing is configured to be mounted to a vehicle and, in response to a triggering event at the unlocking mechanism, the microcontroller is configured to allow a previously authenticated remote device to connect and, once a connection is established with the remote device, the transmitter is configured to send an unlock signal to an electronic control unit inside the vehicle to unlock a door of the vehicle, wherein the triggering event is initiated when the remote device enters a predetermined range from the vehicle, and when the triggering event is initiated it is determined if the remote device has been previously authenticated, and when it is determined that the remote device was previously authenticated, the remote device provides a code to cause the transmitter to send the unlock signal to the electronic control unit.

13. The device of claim 12, wherein the unlocking mechanism is a chip reader.

14. The device of claim 13, wherein the triggering event occurs when the remote device is in frequency range of the chip reader.

* * * * *